United States Patent [19]

Kanai et al.

[11] 4,294,475

[45] Oct. 13, 1981

[54] FLEXIBLE PIPE CONNECTOR

[75] Inventors: Isamu Kanai, Sayama; Shigeki Okubo, Yokosuka; Kazuo Tsuchiya, Ebina; Toshio Takasaki, Yokohama, all of Japan

[73] Assignee: Bridgestone Tire Company Limited, Tokyo, Japan

[21] Appl. No.: 92,262

[22] Filed: Nov. 8, 1979

[30] Foreign Application Priority Data

Nov. 10, 1978 [JP] Japan ............................ 53-154012[U]

[51] Int. Cl.³ ............................................. F16L 15/02
[52] U.S. Cl. .................................... 285/165; 285/223; 285/302; 285/342; 285/369
[58] Field of Search ............... 285/302, 337, 165, 369, 285/298, 235, 223, 342

[56] References Cited

U.S. PATENT DOCUMENTS

| | | | |
|---|---|---|---|
| 3,405,957 | 10/1960 | Chakroff | 285/369 X |
| 3,547,471 | 12/1970 | Dummire | 285/369 X |

FOREIGN PATENT DOCUMENTS

| | | | |
|---|---|---|---|
| 250104 | 10/1966 | Austria | 285/223 |
| 2261537 | 6/1973 | Fed. Rep. of Germany | 285/235 |
| 2375535 | 7/1978 | France | 285/165 |

*Primary Examiner*—Dave W. Arola
*Attorney, Agent, or Firm*—Sughrue, Mion, Zinn, Macpeak & Seas

[57] ABSTRACT

A flexible pipe connector which makes use of a pair of intermediate sleeves each having one end portion overlapped with and connected through a rubber-like elastic body to a connection pipe, each of said intermediate sleeves being coaxially arranged with the connection pipe and adapted to move in a fluid-tight manner in the axial direction thereof.

5 Claims, 7 Drawing Figures

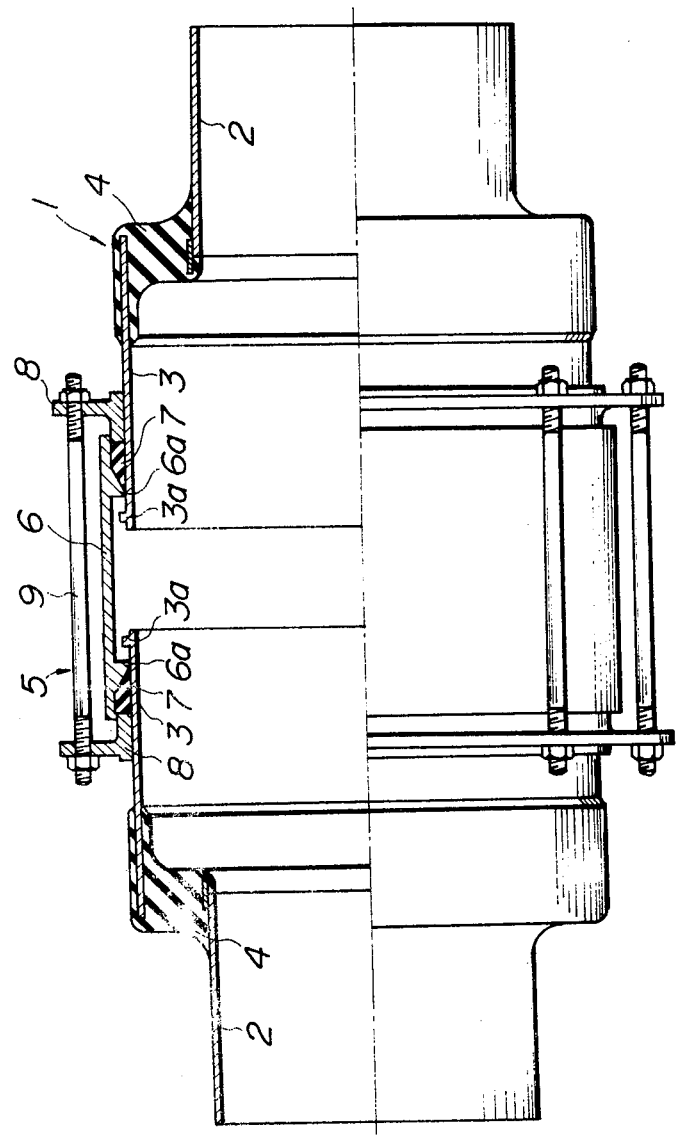

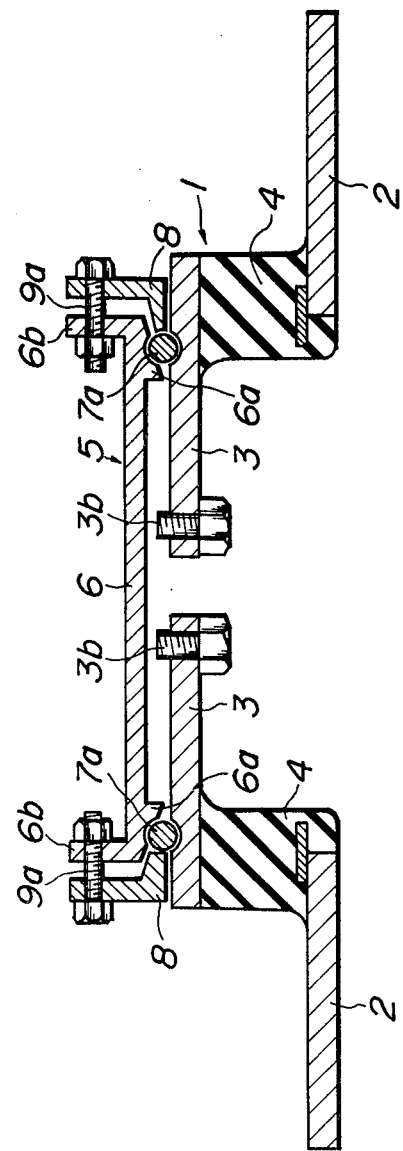

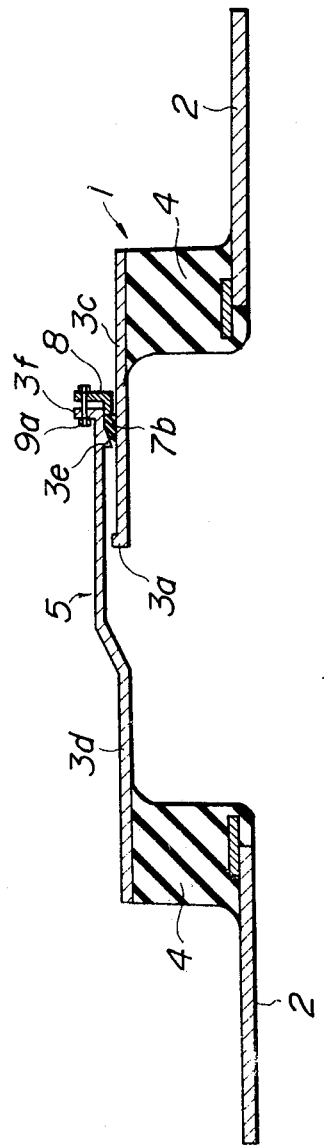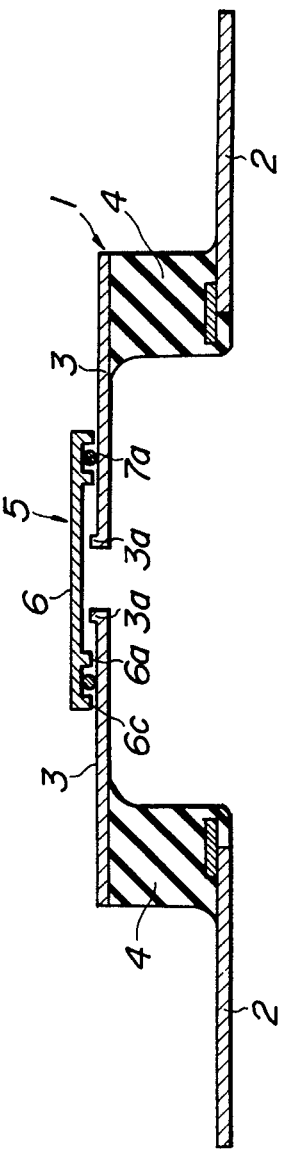

FLEXIBLE PIPE CONNECTOR

BACKGROUND OF THE INVENTION

1. Field of the Invention

This invention relates to a flexible pipe connector which is used for pipe lines for conveying city water, agricultural water or chemical fluids and which can compensate for expansion and contraction due to heat change, discrepancies in alignment, axial misalignments produced when the pipe line becomes irregularly settled.

2. Description of the Prior Art

Heretofore, it has been proposed to provide a flexible pipe connector composed of a pair of connection pipes arranged on the same axial line and spaced apart from each other, a sleeve surrounding across the connection pipes and coaxially arranged therewith and a rubber ring sandwiched between the connection pipes and the sleeve.

Such a flexible pipe connector assembly permits the connection pipes to expand and contract due to temperature change, for example, and can absorb minutes vibrations, but has the disadvantage that if the connection pipes are relatively displaced due to earthquake or the like, the rubber rings may be removed from their given position, thereby breaking the fluid tight seal condition of the connection pipes.

In order to eliminate such disadvantages, it has been the common practice to connect the connection pipes through a rubber-like elastic body to an intermediate sleeve to provide a flexible pipe connector which can compensate for the relative displacement of the connection pipes by the shearing deformation of the rubber-like elastic body.

In such a flexible pipe connector, if the pipe line is irregularly settled such that that portion of the common axis which is located between the opposed connection pipes becomes inclined at an angle $\theta$ with respect to the common axis, a distance l between the opposed connection pipes is changed into a distance $l/\cos \theta$ which is longer than l. As a result, the shearing deformation of the rubber-like elastic body includes a deformation component caused by the elongation of the rubber-like elastic body and the deformation angle is limited within the allowable shearing stress of the rubber-like elastic body. Thus, the pipe connector must be made longer for the purpose of compensating for a large amount of settling.

SUMMARY OF THE INVENTION

An object of the invention, therefore, is to provide a flexible pipe connector which can prevent a rubber-like elastic body from being subjected to shearing deformation produced due to elongation of the axis of the rubber-like elastic body when the associated pipe line becomes irregularly settled and which can compensate for discrepancies in alignment of the associated connection pipes without using an elongated pipe connector.

A feature of the invention is the provision of a flexible pipe connector comprising a pair of connection pipes arranged on the same axial line and spaced apart from each other, a pair of intermediate sleeves each having one end portion overlapped with each of the connection pipes and coaxially arranged therewith, a rubber-like elastic body filling up a gap formed between each of the intermediate sleeves and each of the connection pipes and bonding the former with the latter, and a connection fitting surrounding across the intermediate sleeves to fluid tightly connect both the intermediate sleeves with each other and permits said intermediate sleeve to slidably move in its axial direction.

Further objects and features of the invention will be fully understood from the following detailed description with reference to the accompanying drawings, wherein:

BRIEF DESCRIPTION OF THE DRAWINGS

FIG. 4 is a partial cross-sectional view of one embodiment of a flexible pipe connector according to the invention;

FIG. 5 is a partial cross-sectional view of another embodiment of a flexible pipe connector according to the invention;

FIG. 6 is a partial cross-sectional view of a further embodiment of a flexible pipe connector according to the invention; and FIG. 7 is a partial cross-sectional view of a still further embodiment of a flexible pipe connector according to the invention.

DETAILED DESCRIPTION OF THE PREFERRED EMBODIMENTS

Figure 1:
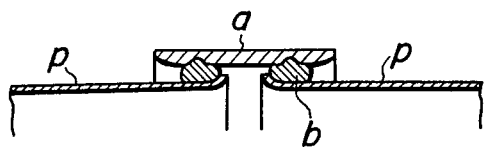
FIG. 1 is a partial cross-sectional view of a conventional flexible pipe connector.

FIG. 1 shows a conventional flexible pipe connector composed of a pair of connection pipes p, p arranged on the same axial line and spaced apart from each other, a sleeve a surrounding across the opposed end portions of the connection pipes p, p and coaxially arranged therewith, and a rubber ring b sandwiched between the end portions of the sleeve a and each connection pipe p and fluid-tightly sealing the former with the latter. In such a conventional flexible pipe connector, the use of the rubber ring b sandwiched between the sleeve a and the connection pipe p permits the connection pipe p to slightly expand and contract due to temperature change, for example, and can sufficiently absorb minute vibrations. But, if each connection pipe p becomes considerably displaced relative to the other connection pipe p due to earthquake or the like, the rubber ring b is removed from its location, thereby inducing drawback of breaking the fluid-tight sealed condition of the pipe line.

Figure 2:
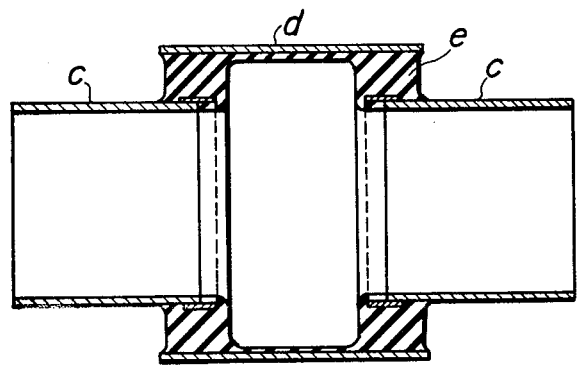
FIG. 2 is a partial cross-sectional view of another example of a conventional flexible pipe connector.

FIG. 2 shows another example of a conventional flexible pipe connector which has heretofore been proposed and widely used for the purpose of eliminating the above mentioned drawback. The conventional flexible pipe connector shown in FIG. 2 is composed of a pair of connection pipes c, an intermediate sleeve d, and a rubber-like elastic body e for connecting the intermediate sleeve d to the connection pipes c and function to compensate for the displacement of each connection pipe c relative to the other connection pipe c by the shearing deformation of the rubber-like elastic body e.

Figure 3:
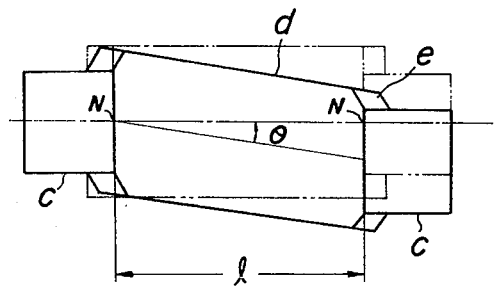
FIG. 3 is a diagrammatic view showing a deformed condition of the conventional flexible pipe connector shown in FIG. 2.

FIG. 3 diagrammatically shows the deformed condition of the conventional flexible pipe connector shown in FIG. 2 in which one of the connection pipes c becomes settled relative to the other connection pipe c from its dot-dash position to its full line position. In such deformed condition, the axial line N-N formed between the opposed connection pipes c, c and having a length l is inclined at angle θ with respect to the axial line N—N so that the length l is changed into a length l/cos θ which is longer than l.

As a result, the rubber-like elastic body e is subjected to the shearing deformation inclusive of deformation due to the elongation thereof, thereby limiting the deformation angle of the rubber-like elastic body e to a range within the allowable shearing stress thereof. Thus, in order to compensate for considerable settling of each connection pipe relative to the other connection pipe, provision must be made of an elongated flexible pipe connector.

FIG. 4 shows one embodiment of a flexible pipe connector according to the invention. In FIG. 4, reference numeral 1 designates a flexible pipe connector as a whole and 2 shows a connection pipe formed of steel and connected to a pipe line (not shown) embedded in the ground.

With the outside of the steel connection pipes 2 are coaxially arranged a pair of intermediate sleeves 3 formed of steel and spaced apart from each other. Each intermediate sleeve 3 has one end portion overlapped with the connection pipe 2. A gap formed between the overlapped portions of the intermediate sleeve 3 and connection pipe 2 is filled up with a rubber-like elastic body 4 to bond these portions with each other.

In the embodiment shown in FIG. 4, the steel connection tube 2 is a straight tube. But, it is a matter of course that the connection tube 2 may be provided at that end portion thereof which is to be connected to the pipe line (not shown) embedded in ground with a flange.

Reference numeral 5 designates a connection fitting as a whole located on the outer surface of the intermediate sleeves 3 and adapted to connect these two intermediate sleeves 3 each other in a fluid-tight manner and permit these two intermediate sleeves 3 to slidably move in their axial direction. In the present embodiment shown in FIG. 4, the connection fitting 5 is composed of a steel pipe 6 provided at its inner ends with projections 6a, 6a and arranged across the intermediate sleeves 3, a rubber ring 7 filled up and fluid-tightly sealing an air gap formed among the end portion of the steel pipe 6, its projection 6a and the intermediate sleeve 3, and an annular member 8, L-shaped in section, surrounding each of the intermediate sleeves 3 and provided with a flange. The opposed flanges are connected by means of fastening means 9 such as bolts and nuts or the like so as to urge the rubber ring 7 in its axial direction toward the center part of the connection fitting 5.

The inner projection 6a makes contact with the outer surface of the intermediate sleeve 3 to limit the axial movement of the rubber ring 7 toward the center part of the connection fitting 5. In addition, when the intermediate sleeve 3 slidably moves outwardly, a projection 3a provided at the free end portions of the intermediate sleeve 3 makes contact with the inner projection 6a, thereby preventing the two intermediate sleeves 3 from excessively separating one from the other.

In the flexible pipe connector 1 shown in FIG. 4, even when the pipe connector 1 becomes deformed as shown in FIG. 3 due to the irregular settling of the embedded pipe line, the elongation of the axial line N—N from l to l/cos θ is absorbed by the sliding movement of the intermediate sleeves 3 relative to the connection fitting 5, so that there is no risk of the rubber-like elastic body 4 being subjected to the shearing deformation due to its elongation. As a result, the rubber-like elastic body 4 is subjected to the shearing deformation due only to the irregular settling of the embedded pipe line. Thus, even when the amount of irregular settling becomes large, it is possible to sufficiently compensate for such settling within the allowable shearing stress of the rubber-like elastic body 4. In addition, in the case of installing the pipe connector, there is no risk of the rubber-like elastic body 4 being subjected to the preload even though the axial distance between the steel connection pipes 2, 2 are not strictly determined to a given distance. Moreover, the connection fitting 5 permits the intermediate sleeve 3 to relatively displace in the circumferential direction, so that the pipe connector can compensate for the large torsional deformation of the embedded pipe line.

FIG. 5 shows another embodiment of a flexible pipe connector according to the invention. In this embodiment, a steel pipe 6 is provided at its both ends with a flange 6b and a projection 6a which is slightly shorter than the projection 6a shown in FIG. 4. Between the end portion of the steel pipe 6 and an intermediate sleeve 3 is inserted a rubber ring 7a which is circular in section. The flange 6b provided at the end of the steel pipe 6 is connected to an annular member 8, L-shaped in section, and surrounding an intermediate sleeve 3 by means of a bolt-nut fastening means 9a.

In the present embodiment, the intermediate sleeve 3 is provided at its free end with a bolt 3b which functions in the same manner as the projection 3a of the previous embodiment shown in FIG. 4.

FIG. 6 shows a further embodiment of a flexible pipe connector according to the invention in section. In the present embodiment, a connection fitting 5 is not provided with the above mentioned steel pipe 6 provided in the previous embodiments shown in FIGS. 4 and 5.

In the present embodiment, with the outside of one of intermediate sleeves 3c is overlapped the end portion of the other intermediate sleeve 3d. The intermediate sleeve 3c is provided at its inner end with a projection 3a and the intermediate sleeve 3d is provided at a position near its inner end with a projection 3e adapted to be engaged with the projection 3a. The intermediate sleeve 3d is also provided at its inner end with a flange 3f which is connected to one annular member 8 surrounding the intermediate sleeve 3c by means of bolts and nuts 9a. The annular member 8 functions to urge a rubber ring 7b inserted between the intermediate sleeves 3c, 3d toward the center portion of a connection fitting 5 in the axial direction.

The embodiment shown in FIG. 6 can also permit the intermediate sleeves 3c, 3d to move relatively in a fluid-tight manner in the axial direction until the projection 3a is brought into engagement with the projection 3e, and as a result, the connection fiting 5 functions in the same manner as in the case of the previous embodiments shown in FIGS. 4 and 5.

FIG. 7 shows a still further embodiment of a flexible pipe connector according to the invention in section. In the present embodiment, a connection fitting is composed of a pair of intermediate sleeves 3 spaced apart from each other by a given distance, and a steel pipe 6 provided at the inner surface of both ends thereof with two spaced-apart projections 6a, 6c adapted to be substantially engaged with each of the intermediate sleeves 3 and arranged across the intermediate sleeves 3, and a rubber ring 7a circular in section and interposed between the two projections 6a, 6c.

In the conventional flexible pipe connector shown in FIG. 2, in the case of compensating for an amount of irregular settling of $(\epsilon)=500$ mm of the pipe line, since the axial length $N-N=1$ is changed into $1/\cos\theta$ and let the deformation angle be $(\theta_1)=9°$, the overall axial length (l) becomes 3,170 mm. To this overall axial length (l) is added each length ($l_1$) of the steel connection pipe, and as a result, the overall length (L) of the pipe connection becomes (L)=3,850 mm.

On the contrary, in the flexible pipe connector according to the invention shown in FIG. 4, let the allowable relative displacement of the intermediate sleeves 3 be 80 mm, for example, and let the rubber-like elastic body 4 be deformed up to the allowable value in design by considering the safety factor of the shearing deformation of the rubber-like elastic body 4 into consideration, then the maximum deformation angle $(\theta_1)$ becomes 18°. As a result, the embodiment shown in FIG. 4 can compensate for the amount of settling which is two times larger than that which can be compensated for by the conventional pipe connector shown in FIG. 2 which is the same in length as the embodiment shown in FIG. 4.

Conversely, the flexible pipe connector according to the invention can reduce its axial length to ½ times smaller than that of the conventional flexible pipe connector in the case of compensating for the settling whose amount is the same as that produced when the conventional flexible pipe connector is used.

A stated hereinbefore, the flexible pipe connector according to the invention has a number of advantages. In the first place, the flexible pipe connector can sufficiently compensate for large irregular settling of the pipes. Secondly, the overall length of the flexible pipe connector can be made shorter than that of the conventional flexible pipe connector when the same amount of settling is to be compensated. Third, the flexible pipe connector can compensate for the torsional displacement of an embedded pipe line. Finally, the flexible pipe connector can be installed in an extremely easy manner.

What is claimed is:

1. A flexible pipe connector comprising; a pair of connection pipes arranged on the same axial line and spaced apart from each other, a pair of intermediate sleeves each having one end portion overlapped with each of said connection pipes and coaxially arranged therewith, each of said intermediate sleeves being provided at its opposed end portion with projections defining abutments limiting axial movement of said intermediate sleeves away from each other, a rubber-like elastic body filling up a gap formed between each of said intermediate sleeves and each of said connection pipes and bonding the former with the latter, and connection fitting means to fluid-tightly seal and connect both said intermediate sleeves with each other and permitting said intermediate sleeves to slidably move in the axial direction and limit in cooperation with said projections said movement away from each other.

2. The flexible pipe connector according to claim 1, wherein said connection fitting means comprises a steel pipe provided at the inner surface of both ends thereof with a projection adapted to be substantially engaged with said projection of each of said intermediate sleeve and arranged across said intermediate sleeves, a rubber ring filled up and fluid-tightly sealing a gap formed among the end portion of said steel pipe, said projection thereof and said intermediate sleeve, an annular member L-shaped in section and surrounding each of said intermediate sleeves and urging said rubber ring in the axial direction toward the center part of said connection fitting, and a fastening member for connecting said annular members with each other.

3. The flexible pipe connector according to claim 1, wherein said connection fitting means comprises a steel pipe provided at the inner surface of both ends thereof with a projection adapted to be substantially engaged with said projection of each of said intermediate sleeves and arranged across said intermediate sleeves, said steel pipe being provided at the outer surface of both ends thereof with a flange, a rubber ring circular in section and inserted in a gap formed among the end portion of said steel pipe, said projection thereof and said intermediate sleeve, and an annular member L-shaped in section and surrounding each end of said intermediate sleeves and connected to said flange by means of a fastening member.

4. The flexible pipe connector according to claim 1, wherein said pair of intermediate sleeves each have one end portion overlapped with and connected through said rubber-like elastic body to a respective connection pipe, free ends of said intermediate sleeves overlapped with each other and fluid-tightly sealed and connected by said connection fitting means.

5. The flexible pipe connector according to claim 1, wherein said connection fitting means comprises a steel pipe provided at the inner surface at each end thereof with two spaced-apart projections, each of said two spaced-apart projections arranged across said intermediate sleeves, and a circular rubber ring interposed between each of said two projections to seal said intermediate sleeves with each other.

* * * * *